United States Patent
Kress

[15] 3,645,033
[45] Feb. 29, 1972

[54] FISHING LURE HAVING A FISHHOOK IMPELLER

[72] Inventor: James H. Kress, 580 Harwood Ave., Satellite Beach, Fla. 32935

[22] Filed: Sept. 18, 1970

[21] Appl. No.: 73,327

[52] U.S. Cl. ............................43/26.2, 43/42.16, 43/42.19, 43/44.82
[51] Int. Cl. ......................................................A01k 85/06
[58] Field of Search ................43/42.19, 26.2, 42.16, 42.17, 43/42.12, 42.2, 42.51, 44.82

[56] References Cited

UNITED STATES PATENTS

| | | | |
|---|---|---|---|
| 2,498,352 | 2/1950 | Bergman | 43/26.2 |
| 261,194 | 7/1882 | Wylly | 43/42.51 |
| 2,334,613 | 11/1943 | Dunkelberger et al. | 43/44.82 |
| 2,159,230 | 5/1939 | Sage | 43/42.16 |

Primary Examiner—Samuel Koren
Assistant Examiner—J. F. Pitrelli
Attorney—Rose & Edell

[57] ABSTRACT

A fishing lure employs an array of fishhook members as an impeller to cause a part of the lure to rotate as it is moved through the water. In one arrangement, the lure is provided with diving planes having their angle of attack altered periodically by a mechanism driven from the rotating impeller. The angle of attack of the diving planes may, in different embodiments, be maintained alternately in one or the other positions set by the drive mechanism or maintained normally in a neutral position with brief periodic intervals of alternately positive and negative angles of attack.

8 Claims, 7 Drawing Figures

Patented Feb. 29, 1972 3,645,033
2 Sheets-Sheet 1
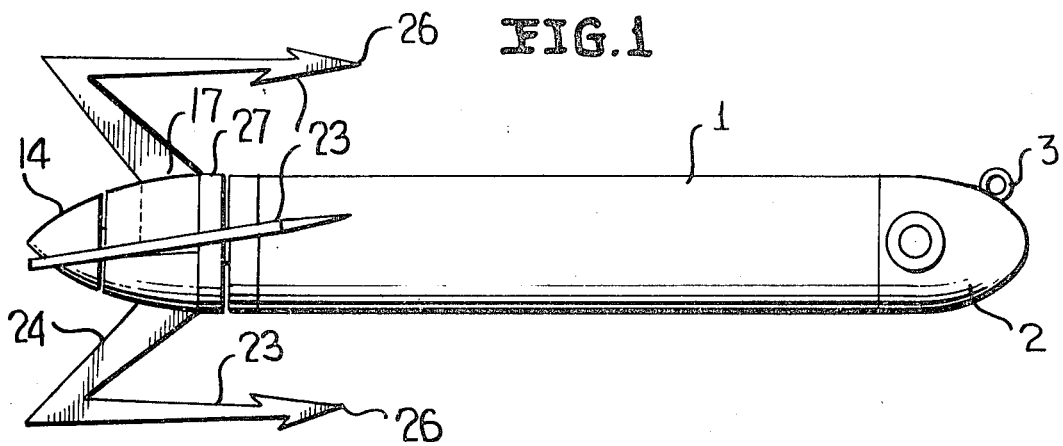
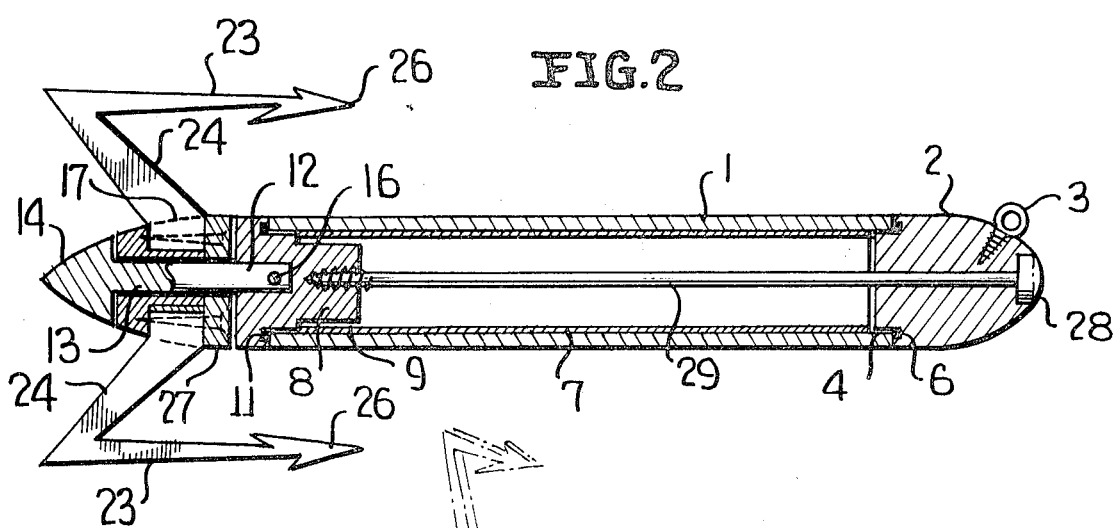
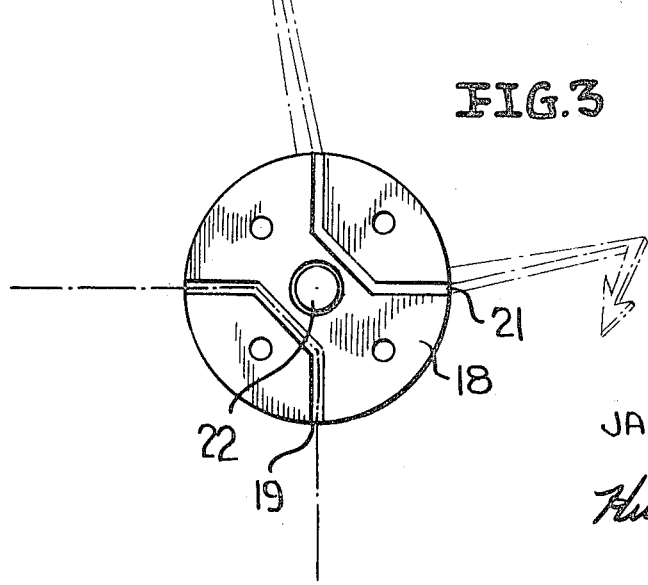
INVENTOR
JAMES H. KRESS
Hurvitz & Rose
ATTORNEYS

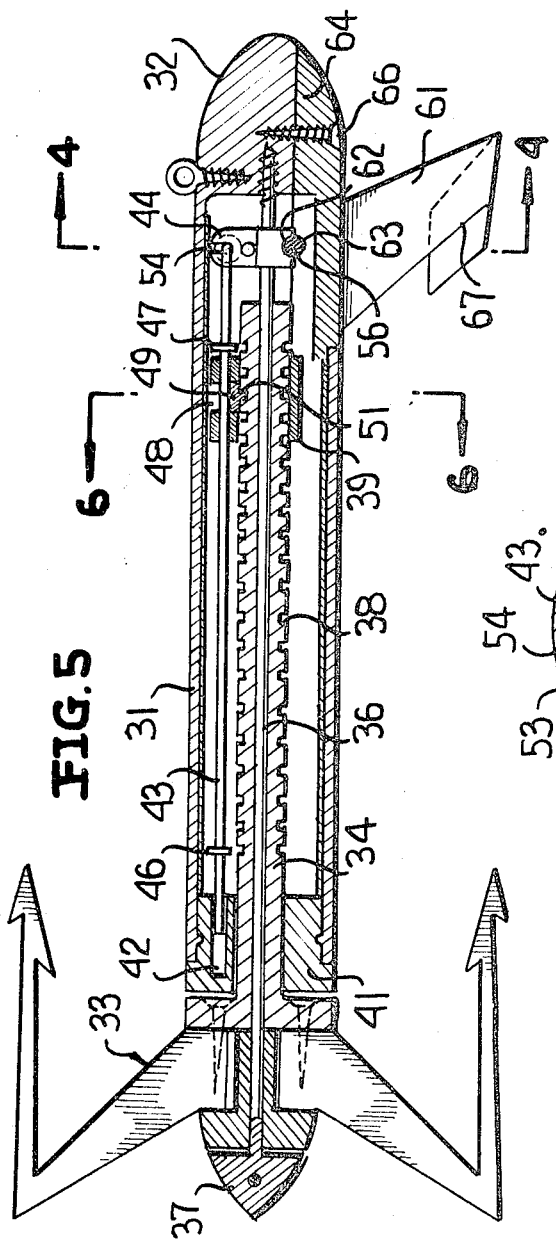
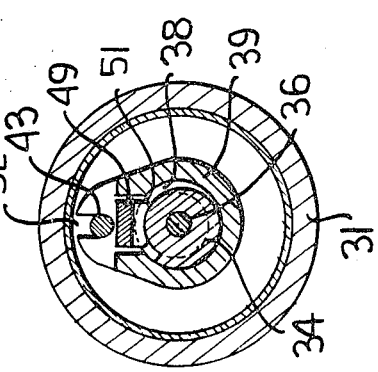
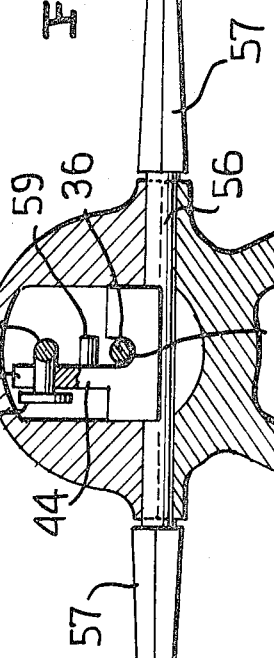
INVENTOR
JAMES H. KRESS
ATTORNEYS 3,645,033

FISHING LURE HAVING A FISHHOOK IMPELLER

BACKGROUND OF THE INVENTION

Fishing lures having impellers to create a "live" effect and/or to drive various mechanisms such as diving planes are known in the art. An example of a fishing lure having diving planes controlled by an impeller is U.S. Pat. No. 2,498,352.

The fishing lures of the prior art impeller type employ both impeller and fishhooks as distinct entities. Further where variable diving planes are employed in the prior art the design of the driving mechanism is quite complex and is not such as to provide substantial flexibility in the operation of the diving planes.

It is an object of the present invention to provide an impeller for fishing lures in which the impeller blades constitute the fishhooks.

It is another object of the present invention to provide a fishing lure having movable diving planes driven by an impeller wherein the planes are alternated between dive and ascent control positions.

It is still another object of the present invention to provide impeller-driven, diving planes for a fishing lure in which the diving planes are normally in a neutral position and are periodically diverted to positive and negative angles of attack for short intervals.

SUMMARY OF THE INVENTION

In accordance with the present invention the fishing lure comprises a hollow cylindrical body having a rotatable hub mounted at the rear. A series of, for instance, four fishhooks are secured to the hub, the hooks being generally in the shape of outwardly extending arms with forwardly directed flat blades having spearlike ends. The outwardly extending arms and forwardly directed blades are of sufficient longitudinal length and are sufficiently skewed relative to the longitudinal axis of the body to provide a good impeller action when the lure is towed through the water. The rotating blades excite and attract the fish which strike the rotating blades and are caught thereby.

The body being hollow may be weighted or not, as the fisherman see fit, to control the average depth at which the lure is positioned. Also the mechanism may be readily disassembled so that different colored hollow tubes may be inserted in the bottom cylindrical member to excite different types of fish.

In accordance with a second feature of the invention, the impeller of the first embodiment is employed to motivate a novel drive mechanism for diving planes located at the front of the lure. The lure may run alternately deep and shallow or oscillate continuously between deep and shallow positions depending upon the specific drive mechanism employed; both mechanisms being provided in accordance with the present invention. In this embodiment of the invention a stabilizer may be provided at the front of the lure so as to provide stability against rotation about the longitudinal axis.

The drive mechanism in accordance with the present invention constitutes an endless screw having a member which travels there along. At its two extreme positions the member causes the diving planes to be rotated to a negative or positive attack angle depending upon the end at which the travelling member is at a given instant. The driving planes may be situated such that they maintain the positive or negative angle of attack only during periods of direct engagement by the travelling member or alternatively at all intervals between actual engagement. This latter feature depends upon the positioning of the diving planes relative to their axis of rotation.

The above and still further objects, features and advantages of the present invention will become apparent upon consideration of the following detailed description of specific embodiments thereof, especially when taken in conjunction with the accompanying drawings, wherein:

DESCRIPTION OF THE DRAWINGS

FIG. 1 is a side view in elevation of a first embodiment of a fish lure of the present invention;

FIG. 2 is a cross-sectional view of the side elevation of the lure of FIG. 1;

FIG. 3 is a front view of the impeller of FIG. 1;

FIG. 4 is a front view partially in section of a second embodiment of the lure of the present invention;

FIG. 5 is a cross-sectional view of the side elevation of the lure of FIG. 4;

FIG. 6 is a cross-sectional view taken along section 6—6 of FIG. 5; and

FIG. 7 is a diagrammatic view illustrating possible locations of the diving plane shaft relative to the center of torque of the diving planes.

DESCRIPTION OF THE PREFERRED EMBODIMENTS

Referring now specifically to FIGS. 1 and 2 of the accompanying drawing, the fishing lure of the first embodiment of the present invention constitutes a hollow cylindrical member 1 having a solid cylindrical nose member 2 rounded at the front to provide a rounded but blunt front end. A hook 3 for a line is provided at the front for towing purposes. The nose 2 has a rearward region 4 of reduced diameter providing an annulus having an external diameter approximately equal to the internal diameter of the sleeve 1. A further recess 6 is provided in the region 4 to receive an O-ring such that when the members are clamped together a watertight seal is provided.

The hollow sleeve 1 may be made of a clear plastic to receive interiorly thereof a colored sleeve 7 which may readily change the effective color of the lure. A cylindrical tail member 8 is circumferentially recessed at 9 to fit interiorly of the sleeve 7. The tailpiece 8 is also recessed at 11 to receive an O-ring so that upon clamping of the device a watertight seal is provided between the sleeve 1 and the tail member 8. The tail member 8 has a longitudinally extending bore 12 which receives a shaft 13 having an integral hub 14; the shaft 13 being secured to the tail member 8 by a pin 16.

The impeller, generally designated by reference numeral 17, comprises a cylinder 18 having slots 19 and 21 formed therein. Each slot intersects the circumference of the solid cylinder 18 at two regions displaced 90° from one another and from the adjacent corresponding regions of the other slot. Thus the slots intersect the circumference of the cylinder 18 at 90° intervals about its periphery. The cylinder 18 also has a center axial hole 22 through which the shaft 13 may fit.

The slots 19 and 21 are adapted to receive the fishhook impellers each of which comprises a pair of forwardly extending arms or spearlike members 23 which, as seen in FIG. 1, have a predetermined angle of skew relative to the longitudinal centerline of the lure and although narrow are relatively deep radially to provide a large surface area for interaction with the water. It is this angle of skew and the depth of the blades which impart rotating motion to the impeller as the lure is drawn through the water. The spearlike members 23 are carried on generally radially extending arms 24 which in the forward backward plane of the device extend rearwardly from the member 18. Thus the members 23 and 24 form an acute angle therebetween. The members 23 may carry simply a sharp point or a barb such as barb 26 as illustrated in FIGS. 1 and 2.

The fishhook impellers are held in the slots 19 and 21 respectively in the cylinder 18 by a circular disk 27 which, as viewed in FIG. 2, is secured to the forward end of the cylindrical member and are held thereto by appropriate means, such as screws.

To assemble the device the tail member 8 is inserted in the hollow cylindrical sleeve 1 and the impeller secured thereto by the shaft 13-hub 14 arrangement. The color sleeve 7 may then be inserted, from the front, and the headpiece 2 inserted in the sleeve 1. An elongated screw 29 is then inserted through a bore 28 in the headpiece 2 and threshold into appropriately threaded aperture in the tailpiece 8. The headpiece 2 is recessed as at 28 to receive the head of the screw 29.

The spacing provided between the tailpiece 8 and the rear hub 14 is such as to permit the cylinder 18 to rotate freely about the shaft 13 so that when the lure is pulled through the water the blades or fishhooks are caused to rotate in unison thereby attracting fish.

It is seen from the above that a relatively inexpensive and simple fishing lure has been provided in which an impeller action is provided by the use of the fishhooks as impeller blades. The device may be fabricated, except for the fishhooks, almost entirely from plastic.

Referring now specifically to FIGS. 4–6 of the accompanying drawings there is illustrated a fishing lure in accordance with a second embodiment of the present invention. The lure comprises a hollow cylindrical body 31 preferably of clear plastic material having integral therewith a head member 32. A front lower portion of the head member 32 and of the hollow body 31 is removed to provide an opening into the front hollow portion of the body which is necessary during the assembly operation. The impeller region which is generally designated by the reference numeral 33 is substantially the same as illustrated in FIG. 2, except that formed integrally with the impeller is a hollow shaft 34 which extends from the impeller forwardly into the region of the opening adjacent the front of the lure. A shaft 36 carried on a hub 37 extends through the hollow shaft 34 and engages a threaded portion in the head portion 32 of the main lure body.

The hollow shaft 34 has an endless screw 38 formed thereon and a follower 39 is positioned on the endless screw 38 so that as the impeller rotates the follower 39 shuttles back and forth between two extreme positions determined by the location of the two ends of the thread of the endless screw 38.

A tailpiece 41 is provided which is inserted in the hollow member 31 to seal the end thereof; this member having a central aperture to receive the hollow shaft 34. The end member 41 has a circular longitudinal bore 42 which receives one end of a translatable rod 43; the other end of which is received in a crank member 44 to be described in greater detail subsequently. The rod or shaft 43 has two shoulders formed thereon adjacent its opposite ends, these being the shoulders 46 and 47 of FIG. 5.

The follower 39 is more fully illustrated in FIG. 6 and comprises a hollow body which is solid around the bottom and the side of the screw 34 along its longitudinal length but at the top is provided with a transverse central recess 48 which extends down to and slightly beyond the top of the hollow shaft 34. Seated in this recess is a member 49 having a tooth 51 which engages the thread on the endless screw of the hollow shaft 34. The top of the follower 39 is longitudinally recessed as at 52 so as to receive the rod 43. The rod 43 holds the member 49 in place with its tooth 51 seated in the endless thread. Thus upon rotation of the endless thread the member 49 is constrained to translate back and forth along the thread and carries the follower 39 therewith. The follower 39 engages the shoulders 46 and 47 adjacent its two ends of travel and causes the rod 43 to translate during such intervals; that is, those intervals when the follower 39 is adjacent the two ends of the endless screw thread 38 on the hollow shaft 34.

The end of the rod 43 has a finger 53 which is disposed at right angle to the remainder of the rod. The finger 53 extends into a slot 54 formed in the upper end of a rocker member 44. The rocker member 44 is formed integrally with a shaft 56 which carries on its opposite ends diving planes 57. The rocker member in addition to having the upper slot 54 for receiving the finger 53 of the shaft 43 has a vertically extending recess 58 which receives the shaft 36 of the assembly. A horizontal shoulder 59 extends over the top of the recess 58 and serves as a stop to limit the dive plane angles.

In the position illustrated in FIG. 5, the dive planes 57 have a zero angle of attack. However upon translation of the shaft 43 either forwardly or rearwardly, the angle of attack of the dive planes is changed to produce vertical movement of the lure in one direction or the other. The shaft 56 is retained by cooperation of the hollow cylindrical member 31 and a further body member generally designated by the reference numeral 61. The body member 31 is provided on opposite sides with two semicircular recesses 62 of a diameter equal substantially to the diameter of the shaft 56. The body member 61 is provided with corresponding semicircular recesses 63 which when the body member 61 is assembled to the remainder of the lure defines with the recess 62 a circular opening or aperture which securely holds the shaft 56.

The member 61 has a front solid portion 64 which mates with the member 32 of the main lure of the body and is secured thereto by screws such as the screw 66. The portion of the body member 61 rearwardly of the region of the main body member 32 is an arcuate hollow member which exactly mates with the walls of the member 31 so as to provide a tight fit between the members when secured to the main body portion 32. The body member 61 also carries planing stabilizers 67 for providing stability to the lure.

The apparatus of FIGS. 4 and 6 is capable of two modes of operation depending upon where the shaft 56 enters the diving planes 57 and this can be more fully described with reference to FIG. 7. In FIG. 7 there is illustrated a foil 68 and two circles 69 and 71 indicating shaft locations relative to the foil. If the shaft 56 is secured to the foil at the location 69 then whenever a rotational force is not supplied to the shaft, the foil 68 tends to assume a neutral angle of attack when moving through the water due to the large torque created on the foil body by the water acting rearwardly of the shaft. If, on the other hand, the shaft 56 enters the foil at the location 71 then the major portion of the foil is forward of the shaft and once the foil is displaced from a neutral angle of attack it remains in the position in which it is placed until a subsequent force causes it to change positions.

Referring now to FIG. 5 of the accompanying drawings, if it is assumed that the follower 39 is in the location illustrated and is caused to continue to move forward towards the body portion 32 then the diving planes 57 are turned down, that is, assume a negative angle of attack and the lure dives. If the shaft is at the location 69 illustrated in FIG. 7, as soon as the follower 39 is caused to move towards the rear of the lure sufficiently to disengage the shoulder 47 on the shaft 43, the diving planes assume a neutral position and the lure discontinues its dive and remains at a selected depth or more particularly may tend to gradually rise due to the upper pull of the line. If, however, the shaft 56 enters the lure at the position 71 once the diving planes have been placed in a negative angle of attack due to forward movement of the shaft 43, the diving plane remains in a negative attitude and the lure continues to dive until the follower 39 engages the shoulder 46 and causes the diving plane to be rotated counterclockwise about the shaft into a positive angle of attack. Thereafter the lure continues to rise until the follower 39 again engages the shoulder 47 on the shaft 43. Thus depending upon the placement of the shaft 56 relative to the diving planes 57 two different modes of operation may be achieved. The diving planes 57, shaft 56 and crank member 44 may be formed of one molded piece, in which case the selection of the type of lure is made at the factory. However the shaft 56 and member 44 may be made as a single piece and the diving planes 57 made separately with two holes in each of the planes, for instance 69 and 71 of FIG. 7, then the fisherman may select the type of operation at will.

While I have described and illustrated specific embodiments of may invention, it will be clear that variations of the details of construction which are specifically illustrated and described may be resorted to without departing from the true spirit and scope of the invention as defined in the appended claims.

I claim:
1. A fishing lure comprising:
   a body member,
   a tail member supported at one end of said body member,
   an impeller rotatably secured to said tail member,
   impeller blades secured to said impeller, said impeller blades each comprising an outwardly extending arm and a forwardly directed spearlike member,
said spearlike member being skewed relative to the longitudinal axis of said lure and having a relatively deep dimension generally radial relative to said body member, said spearlike member having a fishhook formed at the front thereof.

2. The combination according to claim 1 wherein said body member further comprises a hollow sleeve, and
a head member partially insertable in one end of said sleeve,
said tail member being partially insertable in the other end of said sleeve.

3. The combination according to claim 1 wherein said impeller further comprises:
a cylinder,
slots formed in one end of said cylinder,
a pair of said impeller blades comprising a U-shaped member having the base thereof bent so that said deep dimensions of said spearlike members lie at generally a prescribed angle relative to one another,
said base being seated in said slot in said cylinder, and
means securing said base in said slot.

4. The combination according to claim 3 wherein there are two U-shaped members,
whereby four spearlike members are provided, and
wherein said cylinder is provided with two slots, one for said base of each U-shaped member.

5. The combination according to claim 1 further comprising an elongated hollow shaft secured to said impeller for rotation therewith,
said hollow shaft extending into said body member and having an endless screw thread formed on the exterior surface thereof,
a pair of movable diving planes rotatably secured to said body member adjacent the front end thereof,
a follower positioned on said endless screw for translation along said hollow shaft upon rotation of said hollow shaft, and
means for altering the angle of attack of said diving planes in response to movement of said follower.

6. The combination according to claim 5 wherein said last mentioned means comprises
a translatable rod having means adjacent its opposite ends disposed in the path of movement of said follower,
means for supporting said rod for translation,
a shaft having said diving planes secured to opposite ends thereof for rotation therewith between positive and negative angles of attack,
said shaft lying transverse to said rod, and
means for producing rotation of said shaft upon translation of said rod.

7. The combination according to claim 6 wherein said shaft is secured to said diving planes forward of their center of torque.

8. The combination according to claim 6 wherein said shaft is secured to said diving planes rearward of their center of torque.

* * * * *